US 6,590,151 B1

(12) United States Patent
Merk et al.

(10) Patent No.: US 6,590,151 B1
(45) Date of Patent: Jul. 8, 2003

(54) INFORMATION HANDLING SYSTEM SUITABLE FOR REMOVABLE MOUNTING (75) Inventors: Matt Merk, Kingsley, IA (US); Sarah J. Schmitt, South Sioux City, NE (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/411,926

(22) Filed: Oct. 4, 1999

(51) Int. Cl.[7] .................................................. H05K 9/00
(52) U.S. Cl. ..................... 174/35 R; 361/725; 361/727; 361/683
(58) Field of Search ................. 174/35 R; 361/725, 361/726, 727, 756, 759, 802, 724, 752, 796, 801, 683, 684, 685, 686

(56) References Cited

U.S. PATENT DOCUMENTS

| 4,809,360 A | * | 2/1989 | Kraft ........................... 455/603 |
| 4,934,649 A | | 6/1990 | Stout et al. .................. 248/551 |
| 4,977,532 A | | 12/1990 | Borkowicz et al. ......... 364/708 |
| 5,385,487 A | | 1/1995 | Beitman ..................... 439/540 |
| 5,450,271 A | * | 9/1995 | Fukushima et al. ......... 361/686 |
| 5,450,285 A | | 9/1995 | Schlemmer .................. 361/724 |
| 5,460,441 A | | 10/1995 | Hastings et al. ............ 312/298 |
| 5,571,256 A | | 11/1996 | Good et al. .................... 211/26 |
| 5,587,877 A | | 12/1996 | Ryan et al. .................. 361/683 |
| 5,610,798 A | | 3/1997 | Lochridge ................... 361/683 |
| 5,646,819 A | | 7/1997 | Hill, III ....................... 361/683 |
| 5,701,231 A | | 12/1997 | Do et al. ..................... 361/683 |
| 5,726,866 A | | 3/1998 | Allen ........................... 361/816 |
| 5,761,034 A | | 6/1998 | Chu ............................. 361/687 |
| 5,808,867 A | * | 9/1998 | Wang .......................... 361/695 |
| 5,850,925 A | | 12/1998 | Gandre ........................ 211/26 |
| 5,859,767 A | | 1/1999 | Fontana ....................... 361/818 |
| 5,871,264 A | | 2/1999 | Ohara ...................... 312/334.7 |
| 5,897,178 A | | 4/1999 | Ohara ...................... 312/223.2 |
| 5,949,645 A | * | 9/1999 | Aziz et al. ................... 361/695 |
| 6,181,552 B1 | * | 1/2001 | Neville, Jr. et al. ......... 361/686 |
| 6,282,082 B1 | * | 8/2001 | Armitage et al. ......... 312/223.2 |

FOREIGN PATENT DOCUMENTS

| DE | 920 08 17 U 1 | 7/1992 | ............. G06F/1/16 |
| DE | 296 04 674 U 1 | 7/1996 | ............. G06F/1/16 |
| GB | 2072954 | * 10/1981 | ................. 361/727 |

* cited by examiner

Primary Examiner—Dean A. Reichard
Assistant Examiner—Carmelo Oliva
(74) Attorney, Agent, or Firm—Scott Charles Richardson; Sean Patrick Suiter; Suiter-West (57) ABSTRACT A mounting system capable of removably mounting an information handling system includes an outer case suitable for mounting to a surface and a component tray suitable for slideable movement in the outer case. A coupling device may also be provided for coupling the component tray to the outer case. The component tray is suitable for being slideable removed from the outer case to obtain access to components contained in the component tray. In an additional exemplary embodiment of the present invention, the mounting system includes a locking device. In one embodiment, the locking device prevents removal of the component tray from the outer case. In another embodiment, the locking device prevents removal of a component from a component tray.

40 Claims, 6 Drawing Sheets

INFORMATION HANDLING SYSTEM SUITABLE FOR REMOVABLE MOUNTING

FIELD OF THE INVENTION

The present invention generally relates to the field of information handling systems and particularly to an information handling system suitable for removable mounting.

BACKGROUND OF THE INVENTION

Information technology professionals are challenged to provide information handling systems supporting increasing advances in technology. To provide this advanced technology, it is often necessary to replace an existing information handling system or remove and replace components of the information handling system. Installing new information handling systems may involve running new cables and installing new software on the system. In other instances, it is necessary to update the system, which may involve installing new components on the system. Installing new components on a traditional system often involves unhooking the cables and taking apart the case in order to gain access. This task may be further complicated if an information handling system is not easy accessible in the work environment. Often, the housing, such as a tower case, desk-top case, or the like is hidden from view to increase the available work space, such as by hiding the case under a desk or in the corner of a cubicle. Gaining access to these systems may require even more time on the part of the information technology professional.

Theft of computing assets is also a problem in work environments. Components removed from information handling systems by employees or visitors to the work place are expensive to replace. Furthermore, theft of these components may also compromise company secrets stored on components, such as a hard-drive or other recordable media. For example, the proprietary information may be used by other companies to compete with the company, and may also result in the loss of the rights in the information if the information is made public. In other instances, unauthorized personnel may damage the information handling system causing a loss of vital data. The loss of this information may have significant consequences to the well being of the company.

As a result, there is a need for an information handling system having a housing suitable for providing increased access to components of the system. Such a housing may further allow the information handling system to be stored in a space saving manner. Additionally, it is desirable to provide an apparatus for securing an information handling system to discourage theft and damage of the information handling system.

SUMMARY OF THE INVENTION

Accordingly, the present invention is directed to an information handling system having a housing suitable for removable mounting of the system's components. In an exemplary embodiment, the information handling system includes an outer case for being mounted to a surface and a component tray suitable for slideable movement in the outer case. A coupling device may also be provided for coupling the component tray to the outer case. The component tray may further be removed from the outer case to obtain access to components contained in the component tray.

The information handling system may further include a locking device. The locking device prevents removal of the component tray from the outer case. In another embodiment, the locking device prevents removal of a component from a component tray.

In a further exemplary embodiment, the information handling system includes a coupling device, wherein the coupling device includes a first coupling portion mounted on the component tray and a second coupling portion mounted on the outer case. So that when the component tray is slideably removed from the outer case, the first coupling portion uncouples from the second coupling portion.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally to FIGS. 1 through 8, information handling systems having housings suitable for removable mounting of system components are shown. The information handling system may be connected to a display device to enable a user to perform a variety of functions, such as word processing, spread sheets, presentation generation, or the like. The information handling system may also utilize a wide variety of components and peripheral devices to provide functionality, such as a printed circuit board (e.g. motherboard), a floppy disk, hard disk, optical, laser disk, compact disc read-only memory (CD-ROM), digital versatile disk read-only memory (DVD-ROM), digital versatile disk random-access memory (DVD-RAM), or the like. Additionally, the information handling system may also utilize a wide variety of components including input/output devices to provide additional functionality. Exemplary devices include a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, or the like. For purposes of the present discussion, front is meant to define the portion of the information handling system oriented towards a user, and back as the portion of the information handling system oriented away from a user. Further, exemplary uses of the present invention by an information technologies professional are for descriptive purposes only. The use of these terms is meant in no way to limit the scope of the present invention, the terms being used to merely facilitate discussion of the present invention. It should be apparent that the information handling system of the present invention may be aligned and utilized in a wide variety of orientations as contemplated by a person of ordinary skill in the art.

Figure 1:
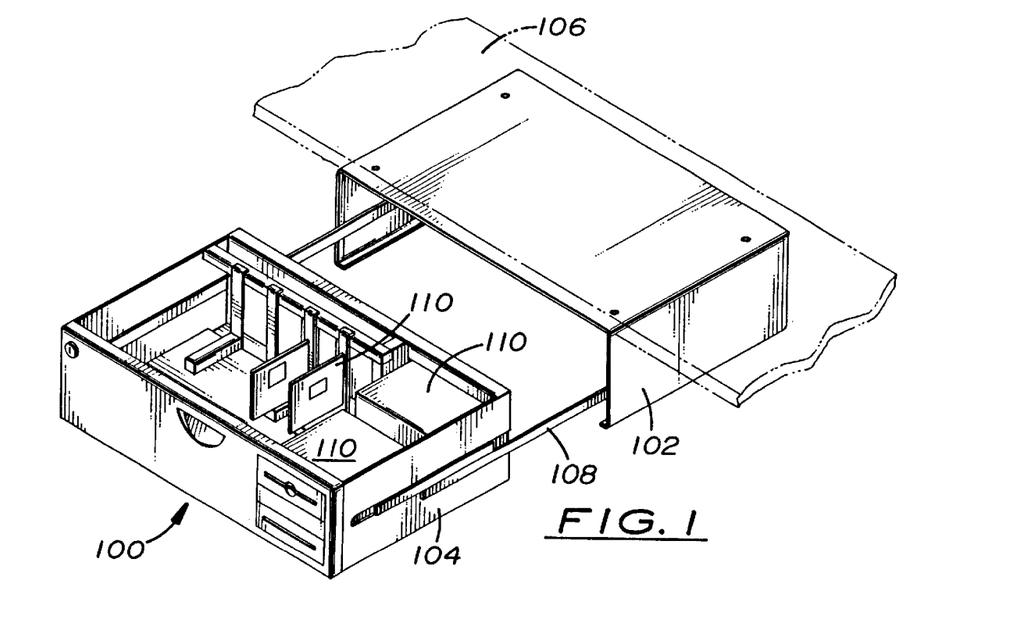
FIG. 1 depicts an exemplary embodiment of the present invention wherein an information handling system having a housing suitable for removable mounting is shown.

Referring now to FIG. 1, an exemplary embodiment of the present invention is described. The information handling system 100 includes an outer case 102 and a component tray 104. The outer case 102 may be mounted to a surface 106. Exemplary surfaces 106 include the underside of a desk top, underside of a counter top, side of a wall, side of a cabinet, top of a cabinet, or any other surface as may be apparent to a person of ordinary skill in the art. The component tray 104 may be mounted within the outer case 102 to enable removable mounting of the component tray 104. For example, a rail assembly 108 may be included for implementing slideable movement of the component tray 104 within the outer case 102. Once the component tray 104 is slideably removed from the outer case 102, components 110 contained within the component tray 104 may be accessed. This enables a user such as an information technologies (IT) professional to access components within the component tray in a time efficient manner. For example, an IT professional may make updates and changes to components contained within the component tray in an expedited manner, instead of disassembling a case or chassis that often is hidden from view. Additionally, since the outer case 102 may be mounted to a variety of surfaces, the information handling system 100 may also conserve space within the work environment, yet keep the information handling system 100 accessible.

Figure 2A:
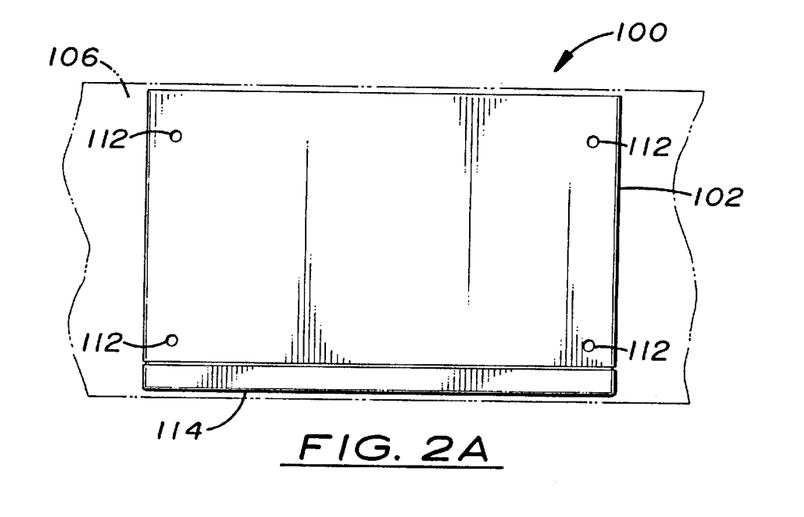
FIG. 2A depicts a top view of an exemplary embodiment of the present invention as shown in FIG. 1.

The information handling system 100 may be positioned on a surface utilizing various mounting methods and techniques, an example of which is shown in FIG. 2A. In this embodiment, the outer case 102 of an information handling system 100 is mounted to a surface 106. The outer case 102 includes a plurality of mounting holes 112 suitable for mounting the outer case 102 to the surface 106. Mounting hardware may be utilized to attach the outer case 102 to the surface 106. Exemplary mounting hardware may include screws, bolts and nuts, prefabricated pegs protruding from the surface 106 for attaching to the outer case 102 utilizing the mounting holes 112, or the like. It should also be apparent that the outer case 102 may utilize additional mounting techniques as apparent to a person of ordinary skill in the art, such as the use of an adhesive, forming the outer case 102 as an integral part of the surface 106, or the like.

It may be desirable to mount the information handling system 100 with respect to the surface 106 so that the front bezel 114 of the component tray 104 (FIG. 1) is flush or recessed with respect to the surface 106. Furthermore, it may also be desirable to form the front bezel 114 so as to overlap the outer case 102. In this way, the information handling system 100 discourages tampering with the outer case 102 so as to prevent unauthorized access to components 110 contained in the component tray 104 (FIG. 1)

Figure 2B:
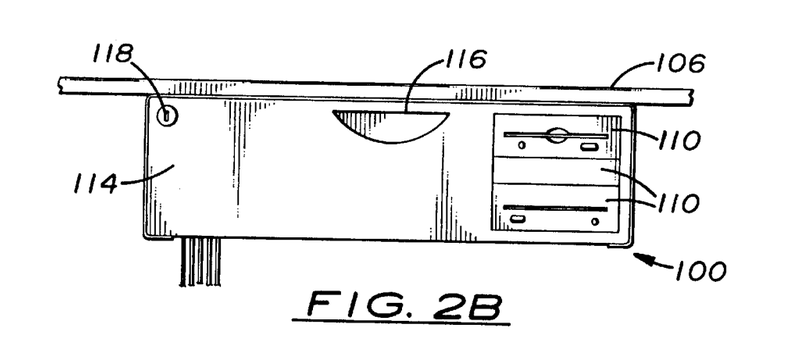
FIG. 2B depicts a front view of an exemplary embodiment of the present invention as shown in FIG. 1.

Additionally, components 110 requiring frequent access by a user, such as a CD-ROM, floppy disk drive, PC card slot, or the like may be mounted in the front bezel 114 of the component tray 104 (FIG. 1), as shown in FIG. 2B. In this embodiment, the information handling system 100 includes a plurality of components 110 mounted in the component tray 104 (FIG. 1) so as to be accessible by a user. A handle 116 may be included on the front bezel 114 to assist the user in sliding the component tray 104 into or out of the outer case 102. Furthermore, the handle 116 may enable an IT professional to more easily transport the component tray 104 (FIG. 1) from one location to another.

It may be desirable in certain instances to control access to the information handling system. As shown in FIG. 2B, a locking device 118, in this instance shown as a key lock, is utilized to prevent removal of the component tray 104 from the outer case 102. In one embodiment, the locking device 118 may include a key lock disposed on the front bezel 114 of the component tray 104. The key lock engages the outer case 102 (FIG. 1) to prevent removal of the component tray 104. Alternatively the locking device 118 may also include an electronic lock to prevent removal of the component tray 104. A password may be utilized to control the electronic lock to permit removal of the component tray 104. The password may be entered locally by a user of the information handling system 100, or remotely by a user to enable local access. For example, an IT professional could enter a password over a network connection to enable a local user to have access to the information handling system 100. In this way, an IT professional may control access to one or more remote information handling systems from a central location.

Figures 3A, 3B:
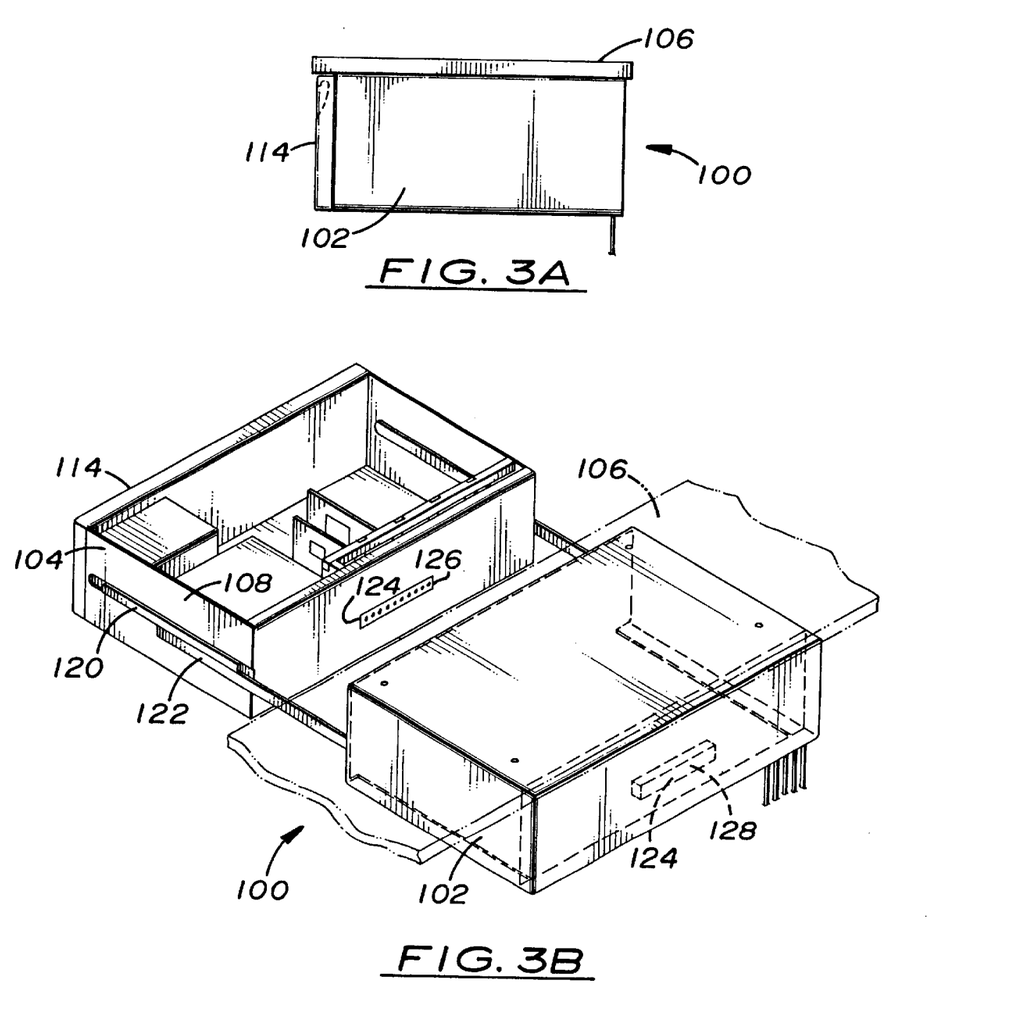
FIG. 3A depicts a side view of an exemplary embodiment of the present invention as shown in FIG. 1 wherein a component tray is inserted in an outer case.
FIG. 3B depicts an exemplary embodiment of the present invention as shown in FIG. 3A, wherein a rail assembly including an extending rail is suitable for extending a component tray away from an outer case.

Referring now to FIG. 3A, a side view of the exemplary information handling system 100 shown in FIG. 1 is provided. The information handling system 100 utilizing an outer case 102 is mounted to a surface 106. The front bezel 114 of a component tray 104 (FIG. 1) may be formed so as to correspond to the dimensions of the outer case 102 and the surface 106. Therefore, once the component tray 104 (FIG. 1) is inserted into the outer case 102, the information handling system 100 forms a compact unit.

Referring now to FIG. 3B, a rail assembly 108 may extend the component tray 104 past the outer case 102 so the user may access components 110 contained in the rear portion of the component tray 104. The information handling system 100 includes an outer case 102 mounted to a surface 106. A component tray 104 including a front bezel 114 may be extended past the outer case 104 so as to enable a user to access components 110 (FIG. 1) contained in the rear portion of the component tray 104. For example, the component tray 104 is capable of being extended past the surface 106 to enable full access to the inside of the component tray 104.

The rail assembly 108 may include a first sliding portion 120 and a second sliding portion 122 that cooperate to increase the range of slideable movement. By utilizing the present embodiment, the rail assembly 108 is capable of extending the rear portion of the component tray 104 past the front portion of the outer case 102.

The outer case 102 may also include a coupling device 124 for electrically coupling the component tray 104 to the outer case 102. In an exemplary embodiment, a coupling device 124 includes a first coupling portion 126 mounted on the component tray 104 and a second coupling portion 128 mounted on the outer case 102. In this way, as the component tray 104 is removed from the outer case 102, the first coupling portion 126 becomes uncoupled from the second coupling portion 128. This may enable the quick removal and attachment of the component tray 104 to replace all the components contained therein. For instance, if an IT professional desired to upgrade an information handling system, the upgrade may be accomplished with a simple swapping of one component tray 104 for another. In this way, the information handling system may be manufactured, tested, and all the necessary hardware installed at a remote location, and then simply installed at the local location.

If testing of the component tray 104 is desired while the component tray is withdrawn from the outer case 102, a cable may be utilized to connect the first coupling portion 126 to the second coupling portion 128. The cable may include portions complementing the first coupling portion 126 and the second coupling portion 128 to enable the functioning of the component tray 104 outside of the outer case 102. It is foreseen that the coupling device may communicate in a wide variety of manners including wireless methods, such as radio frequency and optical, e.g. infrared, fiber optics, or the like.

Additionally, the power source to the component tray 104 from the outer case 102 may also be included with the coupling device 124 to increase the safety of the device. Therefore, a user desiring to obtain access to components contained in the component tray 104 would have the power to the component tray 104 automatically terminated thereby preventing electrical shock to a user while the component tray 104 is open.

Figure 4:
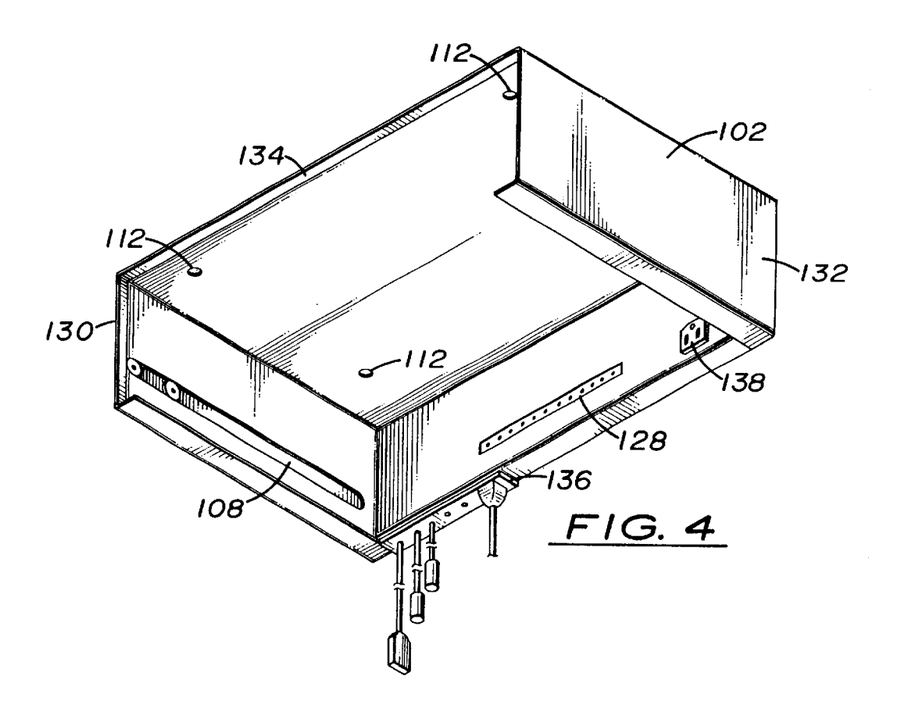
FIG. 4 depicts an exemplary embodiment of an outer case of an information handling system having a housing suitable for removable mounting as shown in FIG. 1.

Referring now to FIG. 4, an exemplary outer case 102 is shown. The outer case 102 includes a plurality of mounting holes 112 for attaching the outer case 102 to a surface 106 (FIG. 1). A first structural member 130 and a second structural member 132 are included for supporting and protecting the component tray 104 (FIG. 1). A rail assembly 108 may be mounted to the structural members 130 and 132 to enable the component tray 104 (FIG. 1) to slide away from the outer case 102. The outer case 102 may also include an electromagnetic interference (EMI) seal 134 to protect the components 110 (FIG. 1) of the component tray 104 (FIG. 1) from electromagnetic interference. A second coupling portion 128 is included for coupling the component tray 104 (FIG. 1) to the outer case 102. A power source 138 may also be included as a part of the second coupling portion 128 and therefor the coupling device 124 (FIG. 3B) to provide an easily attachable source of power to the component tray 104 (FIG. 3B).

A peripheral connector 136 may also be included for connecting peripheral components, such as compact disk read-only memory (CD-ROM), digital versatile disk (DVD), printers, modems, network connections, monitors, telephonic connectors, or the like. In this way, components may be connected to the outer case 102 so that the component tray 104 (FIG. 1) may be removed without the need of disconnecting and reconnecting the components. For example, an IT professional may upgrade the information handling system without the need of manipulating the various types of plugs and connectors generally associated with an information handling system, thereby saving time and money both to the IT professional and the company itself.

Figure 5:
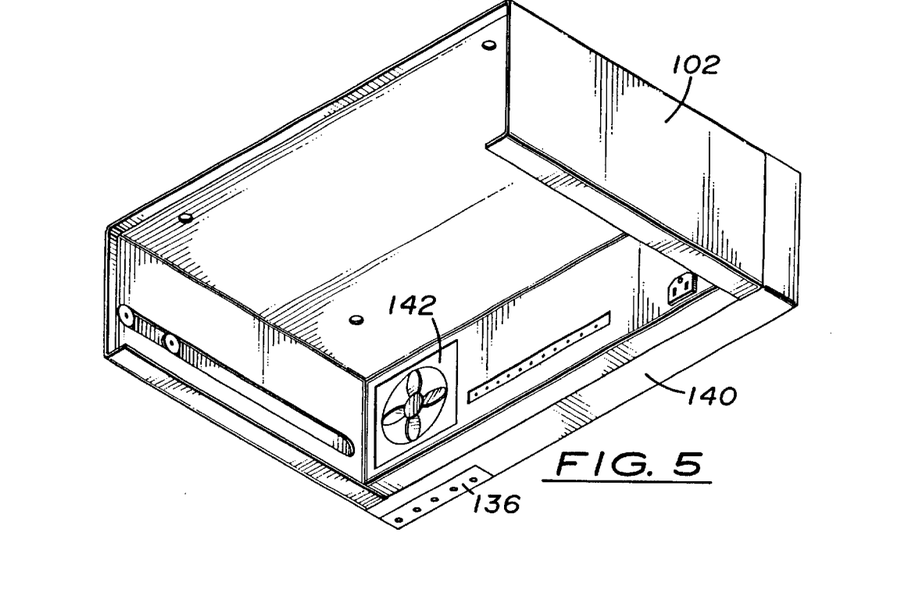
FIG. 5 depicts an additional exemplary embodiment of an outer case of an information handling system having a housing suitable for removable mounting as shown in FIG. 1.

Referring now to FIG. 5, an additional exemplary outer case 102 is shown. The outer case 102 includes a power supply 140 as an integral part thereof. Generally, power supplies are a reliable components that rarely need replacing. Further, the power supply is generally one of the heavier components contained in an information handling system. Therefore, it may be preferable to mount the power supply 140 in the outer case 102 so that the component tray 104 may be removed and replaced without the unneeded replacing of a reliable component.

Additionally, peripheral connectors 136 may be angled so as to aid in the attachment of components to the outer case 102. It may be desirable to color code the peripheral connectors to correspond to the type of device so as to aid attachment. In this way, cables may be run from peripheral devices to the outer case 102, without the need of detaching and reattaching the cables every time the component tray 104 is changed, component installed, or the like.

Figure 6:
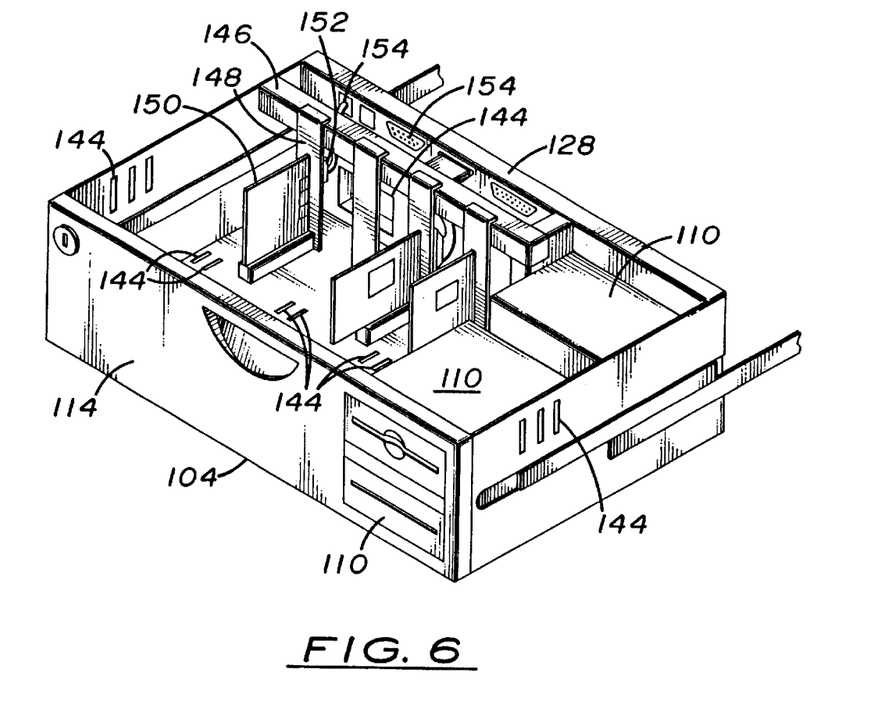
FIG. 6 depicts an exemplary embodiment of a component tray of an information handling system having a housing suitable for removable mounting as shown in FIG. 1.

Furthermore, an outer case 102 may include a cooling device, such as a cooling fan 142 for providing cooling of the component tray 104 (FIG. 1). The cooling fan 142 may utilize vents contained in the component tray 104 to aid airflow to components contained in the component tray, an example of which is shown in FIG. 6. A plurality of vents 144 may be utilized and positioned, both in the outer case 102 and the component tray 104, as desired by a person of ordinary skill in the art to aid in the cooling of components 110 contained in the component tray 104.

In an exemplary embodiment, the component tray 104 includes a card-mounting assembly, including a mounting appendage 146 and a card interface 148. It may be preferable to enable the card interface 148 to slide along the mounting bar 146 to enable cards 150 mounted to the card interface 148 to be easily positioned within the component tray 104. Further, in this example, cables 152 are used to connect the card 150 to interface connectors 154 included with the second coupling portion 128 of the coupling device 124. In this way, the card interface 148 may be positioned along the mounting appendage 146 yet still enable connection of the card 150 to the second coupling portion 128.

Figure 7:
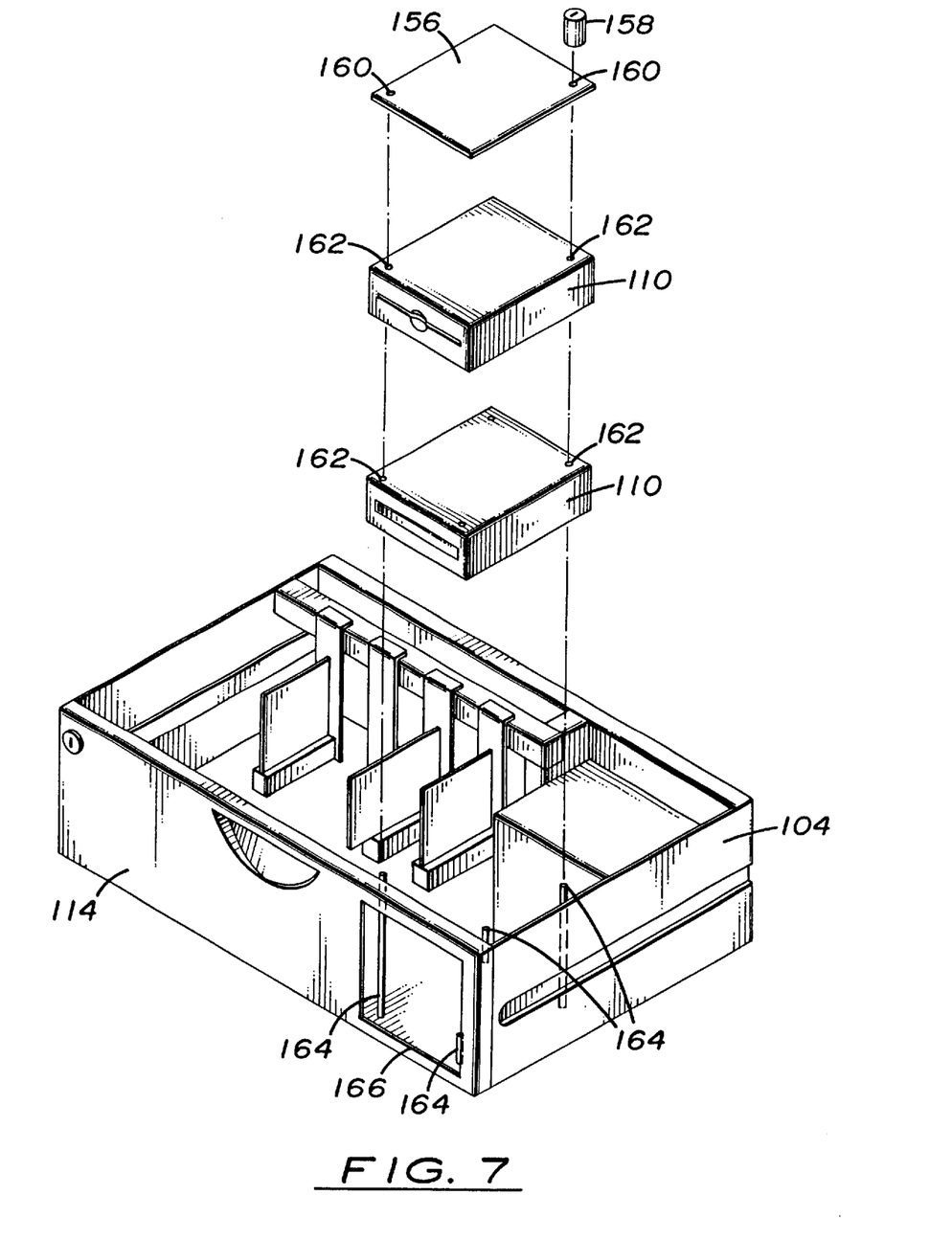
FIG. 7 depicts an additional exemplary embodiment of a component tray of the information handling system as shown in FIG. 1.

Referring now to FIG. 7, an exemplary embodiment is shown where in components may be locked within a component tray to prevent theft. In this example, a component locking device includes a retention plate 156 and lock 158 for engaging posts 164 disposed within the component tray 104. Openings 162 disposed on the components 110 enable the components 110 to be received by the posts 164. The lock 158 may engage a post 164 so as to prevent removal of the retention plate 156, and therefore the components 110. In this way, a user is able to stack.components 110, such as hard drives, compact disk read only memory (CD-ROM), digital versatile disk (DVD), floppy disk drives, or the like within the component tray 104 as desired. Further, if access to the components 110 is desired while the component tray 104 is inserted within the outer case 102 (FIG. 1), an opening 166 may be included in the front bezel 114 to enable such access. For example, floppy disk drives, CD-ROMs, and other devices that typically require the changing of media contained in the device may be positioned next to the opening 166 to permit access.

Figure 8:
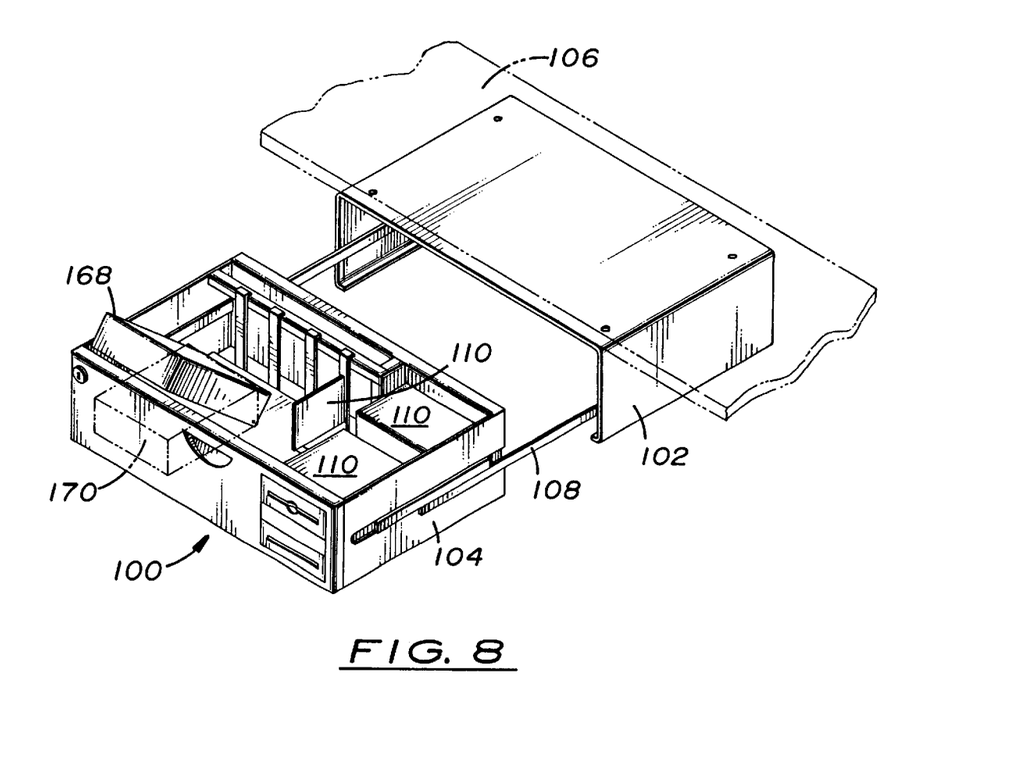
FIG. 8 illustrates a further exemplary embodiment wherein a component carriage positions a component for easy access.

In an additional exemplary embodiment shown in FIG. 8, components may be mounted within a component tray 104 so as to enable easier access when the component tray 104 is removed from the outer case 102. In this embodiment, as a component tray 104 is withdrawn from an outer case 102, a component carriage 168 positions a component for easy access. For example, the component carriage 168 may rotate from a stored position 170 when the component tray 104 is removed to permit an IT professional to swap components. As the component tray 104 slides into the outer case 102 via a rail assembly 108, the component carriage 168 moves back to a stored position 170. This may enable a more compact placement of components 110 contained within the component tray 104 yet still permit the components 110 to be easily accessed.

A structural rib 172 may be disposed on the outer case 102 to further prevent tampering with the information handling system 100. The structural rib 172 is disposed between a first structural member 130 and a second structural member 132 to prevent tampering, such as the bending of the structural members away 130 and 132 from the component tray 104 when inserted in the outer case 102. In this way, the component tray 104 may be further secured in the outer case 102.

It is believed that the information handling system suitable for removable mounting of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A mounting system capable of removably mounting an information handling system, comprising:
    an outer case suitable for being mounted to an underside of a horizontal surface, said outer case being configured to house a power source mounted to said outer case;
    a peripheral connector disposed on said outer case and configured to connect a peripheral device to said information handling system;
    a component tray suitable for removably engaging the outer case; and
    a coupling means for coupling the component tray to the outer case;
    wherein the component tray is capable of being removed from the outer case to obtain access to a component contained in the component tray.

2. The mounting system as described in claim 1, wherein access is obtained to the component contained in the component tray by exposing the component due to the component tray being slideably removed from the outer case.

3. The mounting system as described in claim 1, wherein the outer case includes a plurality of mounting holes suitable for mounting the outer case to the horizontal surface.

4. The mounting system as described in claim 1, wherein the outer case includes an electromagnetic interference seal.

5. The mounting system as described in claim 1, further comprising a rail assembly for enabling slideable movement of the component tray within the outer case.

6. The mounting system as described in claim 5, wherein the rail assembly is suitable for extending the component tray past the outer case so as to enable a user to access a component contained in the rear portion of the component tray.

7. The mounting system as described in claim 1, wherein the coupling means includes a first coupling portion mounted on the component tray and a second coupling portion mounted on the outer case.

8. The mounting system as described in claim 7, wherein when the component tray is slideably removed from the outer case, the first coupling portion uncouples from the second coupling portion.

9. The mounting system as described in claim 1, further comprising a locking device.

10. The mounting system as described in claim 9, wherein the locking device prevents removal of the component tray from the outer case.

11. The mounting system as described in claim 9, wherein the locking device is manipulated by at least one of manually and electronically.

12. The mounting system as described in claim 1, wherein the component tray includes a handle.

13. The mounting system as described in claim 1, wherein at least one of a first component and a second component are stackable.

14. The mounting system as described in claim 1, further comprising a component carriage disposed in the component tray.

15. The mounting system as described in claim 1, further comprising a card mounting assembly disposed in the component tray.

16. The mounting system as described in claim 1, wherein the coupling means includes a wireless connection.

17. An information handling system capable of removable mounting, comprising:
    an outer case suitable for mounting to an underside of a horizontal surface, said outer case being configured to house a power supply mounted to said outer case;
    a component tray capable of slideable movement in the outer case;
    a peripheral connector disposed on said outer case and configured to connect a peripheral device to said information handling system;
    a rail assembly for enabling slideable movement of the component tray within the outer case; and
    a coupling means for coupling the component tray to the outer case;
    wherein when the component tray is slideably removed from the outer case, a component contained in the component tray is exposed thereby permitting access to the component.

18. The information handling system as described in claim 17, wherein the outer case includes a plurality of mounting holes suitable for mounting the outer case to the horizontal surface.

19. The information handling system as described in claim 17, wherein the outer case includes an electromagnetic interference seal.

20. The information handling system as described in claim 17, wherein the rail assembly is suitable for extending the component tray past the outer case so as to enable a user to access a component contained in the rear portion of the component tray.

21. The information handling system as described in claim 17, wherein the coupling means includes a first coupling portion mounted on the component tray and a second coupling portion mounted on the outer case.

22. The information handling system as described in claim 21, wherein when the component tray is slideably removed from the outer case, the first coupling portion uncouples from the second coupling portion.

23. The information handling system as described in claim 17, wherein the locking device prevents removal of the component tray from the outer case.

24. The information handling system as described in claim 17, wherein the locking device is manipulated by at least one of manually and electronically.

25. The information handling system as described in claim 17, wherein the component tray includes a handle.

26. The information handling system as described in claim 17, wherein at least one of a first component and a second component are stackable.

27. The information handling system as described in claim 17, further comprising a component carriage disposed in the component tray.

28. The information handling system as described in claim 17, further comprising a card mounting assembly disposed in the component tray.

29. The information handling system as described in claim 17, wherein the outer case surrounds the component tray when the component tray is coupled to the outer case.

30. The information handling system as described in claim 17, wherein the coupling means includes a wireless connection.

31. A mounting system capable of removable mounting, comprising:
   an outer case suitable for mounting to an underside of a horizontal surface;
   a means for supplying power mounted to said outer case;
   a component tray;
   a means for connecting a peripheral component disposed on said outer case and configured to connect at least one peripheral component to said information handling system;
   a means for slidably removing the component tray from the outer case; and
   a means for coupling the component tray to the outer case;
   wherein when the component tray is slideably removed from the outer case, a component contained in the component tray is exposed thereby permitting access to the component.

32. The mounting system as described in claim 31, wherein the removing means is suitable for extending the component tray past the outer case so as to enable a user to access a component contained in the rear portion of the component tray.

33. The mounting system as described in claim 31, wherein the coupling means includes a first coupling portion mounted on the component tray and a second coupling portion mounted on the outer case, wherein when the component tray is slideably removed from the outer case, the first coupling portion uncouples from the second coupling portion.

34. The mounting system as described in claim 31, further comprising a means for locking.

35. The mounting system as described in claim 31, wherein the locking means prevents removal of the component tray from the outer case.

36. The mounting system as described in claim 31, wherein the locking means is capable of being manipulated by at least one of manually and electronically.

37. The mounting system as described in claim 31, wherein at least one of a first component and a second component are stackable.

38. The mounting system as described in claim 31, further comprising a means for removing a component disposed in the component tray.

39. The mounting system as described in claim 31, further comprising a means for mounting a card disposed in the component tray.

40. The mounting system as described in claim 31, wherein said coupling means includes means for wirelessly connecting a component included in the component tray with a component included in the outer case.

* * * * *